(12) United States Patent
Wildgruber

(10) Patent No.: US 12,489,372 B2
(45) Date of Patent: Dec. 2, 2025

(54) ENERGY SYSTEM FOR AN ELECTRIC VEHICLE

(71) Applicant: AUDI AG, Ingolstadt (DE)

(72) Inventor: Mario Wildgruber, Rohrbach (DE)

(73) Assignee: Audi AG, Ingolstadt (DE)

( * ) Notice: Subject to any disclaimer, the term of this patent is extended or adjusted under 35 U.S.C. 154(b) by 191 days.

(21) Appl. No.: 17/975,423

(22) Filed: Oct. 27, 2022

(65) Prior Publication Data

US 2023/0134237 A1 May 4, 2023

(30) Foreign Application Priority Data

Oct. 28, 2021 (DE) .......................... 102021128139.3

(51) Int. Cl.
| H02M 3/00 | (2006.01) |
| B60L 50/60 | (2019.01) |
| B60R 16/03 | (2006.01) |
| H02M 3/335 | (2006.01) |

(52) U.S. Cl.
CPC ......... H02M 3/33573 (2021.05); B60L 50/60 (2019.02); B60R 16/03 (2013.01); H02M 3/01 (2021.05)

(58) Field of Classification Search
CPC ............... H02M 3/33573; H02M 3/01; H02M 3/33571; H02M 7/4815; H02M 1/0074; H02M 3/33576; H02M 3/33584; B60L 50/60; B60L 2210/12; B60L 1/00; B60L 3/0092; B60L 3/04; B60L 58/20; B60L 1/003; B60R 16/03; Y02T 10/70; Y02T 10/7072; Y02T 90/14; H02J 7/0063; H02J 7/007

USPC .............................................. 307/11, 18, 63
See application file for complete search history.

(56) References Cited

U.S. PATENT DOCUMENTS

| 5,698,967 | A | * | 12/1997 | Baer ....................... B60L 53/65 |
| | | | | 320/152 |
| 11,496,042 | B2 | * | 11/2022 | Krause .................... B60L 50/52 |
| 2013/0076129 | A1 | * | 3/2013 | Kunimitsu .............. B60L 58/15 |
| | | | | 307/10.7 |
| 2014/0035531 | A1 | * | 2/2014 | Garnier ................... H02J 7/342 |
| | | | | 320/118 |
| 2014/0042815 | A1 | * | 2/2014 | Maksimovic ......... H01L 31/044 |
| | | | | 307/63 |
| 2014/0204616 | A1 | | 7/2014 | Biebach et al. |
| 2014/0307481 | A1 | * | 10/2014 | Wang ..................... H02M 3/285 |
| | | | | 363/17 |
| 2017/0214252 | A1 | * | 7/2017 | Preindl .................... H02J 7/345 |
| 2020/0055405 | A1 | * | 2/2020 | Duan ..................... H02J 7/0014 |
| 2021/0159710 | A1 | * | 5/2021 | Furukawa ......... H02J 13/00007 |
| 2022/0231537 | A1 | * | 7/2022 | Hirota ........................ H02J 7/16 |
| 2022/0376536 | A1 | * | 11/2022 | Grohmann ................ H02J 1/10 |

(Continued)

FOREIGN PATENT DOCUMENTS

| CN | 102185493 A | 9/2011 |
| CN | 106357116 A | 1/2017 |
| DE | 102013210293 A1 | 12/2014 |

(Continued)

*Primary Examiner* — Rexford N Barnie
*Assistant Examiner* — Terrence R Willoughby
(74) *Attorney, Agent, or Firm* — Seed Intellectual Property Law Group LLP

(57) ABSTRACT

Described herein is a system for the electrical power supply of a vehicle and a method for the electrical power supply of a vehicle.

5 Claims, 1 Drawing Sheet

(56) References Cited

U.S. PATENT DOCUMENTS

2023/0121220 A1* 4/2023 Gannamaneni ......... B60L 53/20
                                                    320/109
2023/0150680 A1* 5/2023 Ukumori ................... H02J 7/00
                                                    307/9.1

FOREIGN PATENT DOCUMENTS

| DE | 202019000939 U1 | 5/2019 |
| EP | 2662964 B1 | 12/2017 |
| WO | WO 2018108779 A1 | 6/2018 |

* cited by examiner

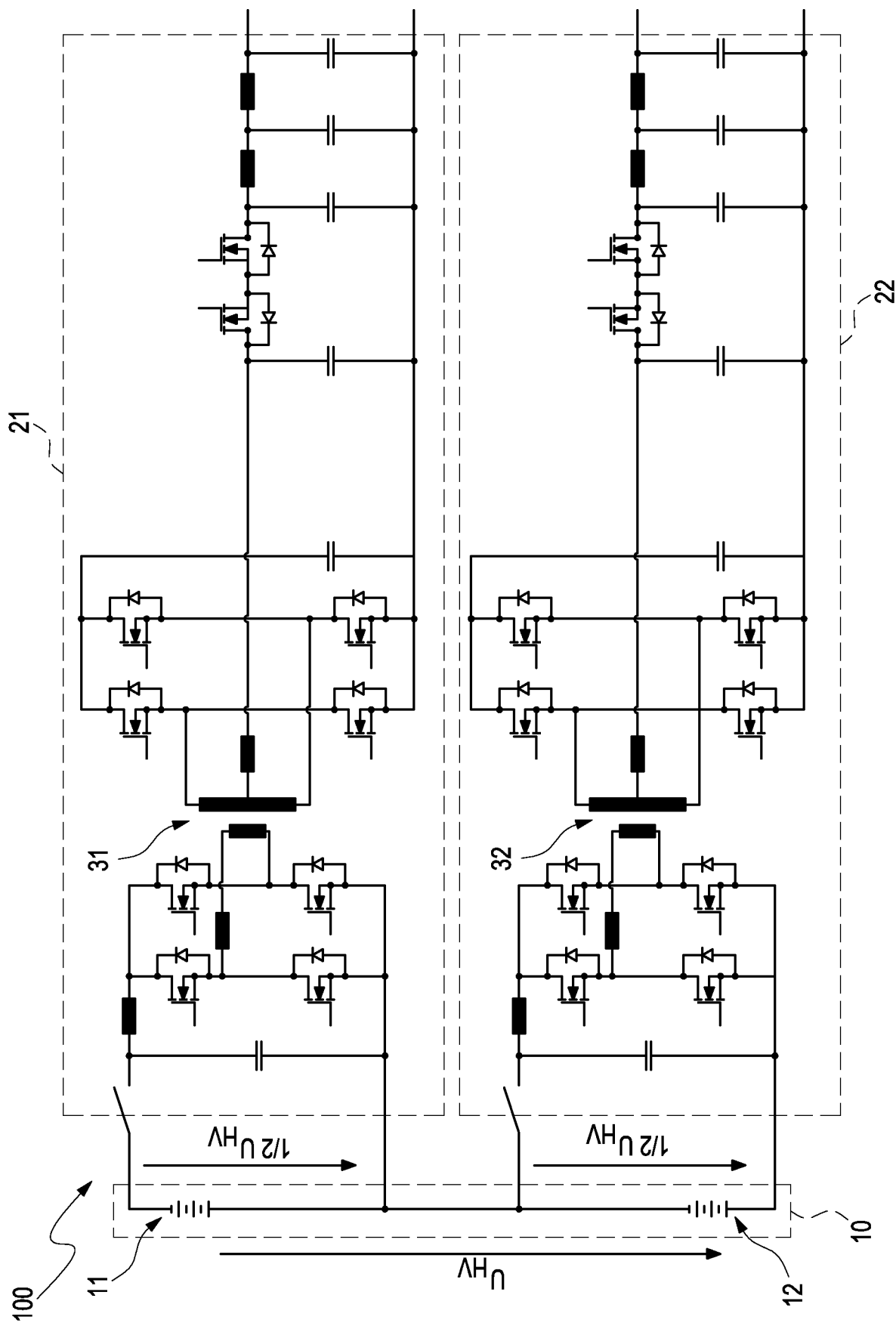

ENERGY SYSTEM FOR AN ELECTRIC VEHICLE

BACKGROUND

Technical Field

Embodiments of the invention relate to a system for the electrical power supply of a vehicle and a method for the electrical power supply of a vehicle.

Description of the Related Art

In present-day electrically propelled vehicles such as plug-in hybrid-electric vehicles (PHEV), battery electric vehicles (BEV), or hybrid electric vehicles (HEV), which are outfitted with a high-voltage energy accumulator (HV battery), direct current converters (DC/DC converters) are used to power the low-voltage onboard network (LV onboard network). The DC/DC converters are primarily powered by the HV battery and are connected after the battery contactor to the full system voltage. These HV networks are not subject to any ASIL safety classification at present and therefore they are only conditionally suited—or not suited at all—to use with highly automated driver assist systems—depending on the modification.

WO 2018/108 779 A1 relates to a device for generating a switched electrical DC voltage, comprising a transformer, a rectifier module and a DC voltage converter module, wherein the transformer comprises a first secondary circuit and a second secondary circuit. To the first secondary circuit there is connected in series a first rectifier and to the second secondary circuit a second rectifier, and to the first rectifier there is connected in series a first switched DC voltage converter and to the second rectifier a second switched DC voltage converter, the DC voltage converters so connected being designed as two-level buck converters.

CN 106 357 116 A discloses a main circuit for a charging and discharging device of a microgrid system and a control method for the main circuit. The main circuit consists of a control circuit and power direction control module, a power supply interface, a filter circuit module, a bidirectional DC/AC rectifier module, a bidirectional DC/DC converter module and an energy accumulator battery pack, these being switched in sequence, wherein a power switch module comprises a contactor KM1 and a contactor KM2 and an alternating current H-bridge single-phase inverter is connected to a primary side and a secondary side of a transformer through the contactor KM1 and the contactor KM2, respectively. The control circuit and power direction control module detects signals regarding the power supply interface, the filter circuit module, the bidirectional DC/AC rectifier module, the bidirectional DC/DC converter module, the energy accumulator battery pack and the power switch module. The switching of the different current pathways of the charging and discharging of the microgrid system is accomplished by switching the contactors connected to the primary side of the high-frequency transformer in accordance with charging and discharging instructions.

CN 102 185 493 A relates to an isolated DC/DC converter and proposes to provide a combined current converter which is capable of realizing an emergency regulating of the output by a series circuit of high-frequency alternating current sides. The combined current transformer comprises two transformers, wherein the primary windings of the two transformers are switched in series and then connected to the two ends of an AC input source. The output of a secondary winding of the transformer T1 is connected to the input end of a rectifier circuit Rec1; the output of the secondary winding of the transformer T2 is connected to the input end of the rectifier circuit Rec2. One end of the output of the rectifier circuit Rec1 is connected to the positive end of an output capacitor Co, and the other end of the output of the rectifier circuit Rec1 is connected to the negative end of the output Vo; one end of a load RL is connected to the positive end of the output capacitor Co and the other end of the load Last RL is connected to the negative end of the output Vo; and the output of the rectifier circuit Rec2 has two alternative pathways. The primary side of the combined current converter can realize a fixed duty cycle, so that the loading of the transformers T1 and T2 is maximized; a feedback control signal need not be sent to the primary side, so that the reliability of the feedback control is improved; the modularization of a plurality of independent output pathways can be easily accomplished; and the rectifier circuits of a secondary side more easily adopt a synchronous rectification technology.

Given this background, one problem to be solved was to provide a reliable supply of electric energy to a low-voltage onboard network of an electric vehicle that also fulfills the safety criteria for a use with highly automated driver assist systems.

BRIEF SUMMARY

Some embodiments include a system for the electrical power supply of an electric vehicle having at least one HV onboard network and at least one LV onboard network.

In the context of the present specification, a HV onboard network shall mean a high-voltage onboard network having a voltage level of more than 200 V, especially in the range of 300 V to 1200 V, such as 400 V or 800 V. A HV battery is a high-voltage energy accumulator with a rated output voltage in the range of 300 V to 1200 V, such as 400 V or 800 V. A LV onboard network shall mean a low-voltage onboard network, having a voltage level of less than 100 V, especially in the range of 10 to 60 V, such as 12 V or 48 V.

Some embodiments are designed for the electrical power supply of an electric vehicle, wherein the vehicle comprises multiple electrical participants, usually consumers or energy sources. The system is arranged in the vehicle and comprises a HV battery or accumulator having two branches connected in series, each having at least one energy accumulator cell. Each branch comprises at least one energy accumulator cell, such as a battery cell, and multiple energy accumulator cells can be connected to each other in parallel or in series in a respective branch.

The poles of the HV battery are connected across circuit breaker elements, such as battery contactors, to a HV onboard network of the vehicle, which comprises high-voltage units of the vehicle, such as electric machines for the propulsion, heating and cooling units, as well as charging modules for alternating current and/or direct current charging of the HV battery. An input module of a DC/DC converter is connected respectively to the poles of the two branches of the HV battery. In one embodiment, the DC/DC converter comprises a DC/AC converter unit, which is connected to the primary winding of a transformer, and an AC/DC converter unit, which is connected to the secondary winding of the transformer. In one embodiment, the DC/AC converter unit is designed as a full bridge. Depending on the power demand and the voltage spread of the HV side, other topologies can also be used. In one embodiment, the DC/AC converter unit is designed as a half-bridge. In another embodiment, the DC/AC converter unit is designed as a resonance converter. In one embodiment, a center tap of the secondary winding is used on the secondary side (center tap technology). Here as well, other topologies may be used. In one embodiment, an active full bridge is used at the secondary side. In another embodiment, a passive or active rectifier is used. In still another embodiment, a current doubler is used.

Among the features of the energy system described herein is that a center tap of the HV battery achieves an enhanced availability of the voltage supply. In addition, the DC/DC converters are moved in front of the main contactors, so that they do not need to be isolated from the power supply voltage in event of a fault in a QM consumer. The power supply of the LV onboard network continues to be assured in event of a fault.

The center tap of the HV battery creates two sub-banks, each having half the system voltage. The energy system described herein has a DC/DC converter topology with two fully independent power pathways for each of the two battery banks. Thanks to two independent (or also redundantly designed) secondary pathways, as many as two LV power feed points can be realized. In normal operation, each phase carries the respective half-power to the transformer. In event of a fault of one battery bank, the full power can be put out to the low-voltage onboard network through the remaining phase. Thanks to this topology, two independent power feed points to the LV energy network can be presented. In this way, on the one hand a better energy distribution can be achieved in a shared network, or two independent partial networks can be supplied with power.

In one embodiment, the output voltages of the two DC/DC converters are the same. In another embodiment, the outputs of the two DC/DC converters are brought together at a common feed point for a LV onboard network. In another embodiment, the outputs of the DC/DC converters form two feed points for a LV onboard network. In yet another embodiment, the outputs of the DC/DC converters form two feed points for two independent sub-networks of a LV onboard network.

In another embodiment, the output voltages of the two DC/DC converters are different. In a further embodiment, the outputs of the DC/DC converters form two feed points for two independent sub-networks of a LV onboard network. In one embodiment, the output voltage of the one DC/DC converter is 12 V and the output voltage of the other DC/DC converter is 48 V.

If it is possible for the DC/DC converters to be situated as an external component outside the energy accumulator or to be situated and thus integrated as an internal component in the energy accumulator.

Some embodiments include a method for the electrical power supply of an electric vehicle, comprising at least one HV onboard network and at least one LV onboard network, and a HV battery, which comprises a first sub-branch and a second sub-branch, which are switched in series. In the method, the at least one HV onboard network is connected to the poles of the HV battery and supplied with electrical energy, and the at least one LV onboard network is connected to the outputs of a first DC/DC converter, the input module of which is connected to the first sub-branch, and a second DC/DC converter, the input module of which is connected to the second sub-branch, and supplied with electric energy.

In one embodiment, the output voltage of the HV battery has a value in the range of 200 to 1200 V, such as in the range of 400 V to 800 V.

In one embodiment, the output voltage of the DC/DC converter has a value in the range of 10 to 60 V, such as in the range of 120 V to 800 V.

In one embodiment of the method, the output voltages of the first and the second DC/DC converter are the same. In another embodiment of the method, the output voltages of the first and the second DC/DC converter are different.

In the method, a HV battery and two DC/DC or direct current/direct current converters are used, the HV battery comprising two branches each having at least one energy accumulator cell and each branch of the energy accumulator and each input module of a DC/DC converter being connected to each other at both sides via conductors, and the poles of the HV energy accumulator provide a HV voltage for the at least one HV circuit and the outputs of the two DC/DC converters provide at least one LV voltage for the at least one LV circuit of the vehicle.

It is possible to implement one embodiment of this method with one embodiment of the proposed system.

In this case, a higher availability is provided for the at least one LV circuit than for the at least one HV circuit.

In the method, electric energy can be exchanged unidirectionally or bidirectionally between the branches or their energy accumulator cells of the HV battery and the participants of the at least one HV onboard network. It is possible for at least one participant to be supplied with electric energy from the HV battery, i.e., from at least one branch of the HV battery. Accordingly, it is possible to charge at least one branch of the HV battery with electric energy from at least one participant or to charge the participant and store electric energy in it. A participant is configured for example as an electric machine for propelling the vehicle, which in one operating mode as an electric motor transforms electric energy from the HV battery into mechanical energy and moves the vehicle. In one operating mode as an electric generator, the electric machine transforms mechanical energy due to motion into electric energy, for example during a recuperation, which is stored in the HV battery. It is possible for a participant to be configured for example as a fuel cell and thus as an energy source, the electric energy of which can likewise be stored in the HV battery. At least one further participant can be designed as an actuator, sensor and/or device, for example, at least one controller of the vehicle.

Thanks to the above described layout of the DC/DC converters and their connection to the branches of the HV battery, a highly available electricity supply of the LV onboard network of the vehicle is provided in a realization of the method and the system. In this case, the LV onboard network is supplied with electric energy from two branches of the HV battery by the two DC/DC converters. The branches of the HV battery, which can also be called sub-branches, form together with the input modules of the DC/DC converters parallel power supply pathways for the participants, or consumers, of the LV onboard network. A fault in one branch will not result in a fault, especially a complete failure, of the electrical power supply of the LV onboard network, since its availability is enhanced thanks to the parallel arrangement of the branches relative to each other. The HV battery can be realized by a variable battery concept, it being conceivable for the branches to have many different energy cells and/or different designs of energy cells, such as battery cells and/or capacitors. Thanks to the parallel power supply through the two DC/DC converters, a fault in one input module does not result in a fault of the electrical power supply of the LV onboard network.

Of course, the above mentioned features and those yet to be explained in the following can be used not only in the particular indicated combination, but also in other combinations or standing alone, without leaving the scope of the present disclosure.

BRIEF DESCRIPTION OF THE SEVERAL VIEWS OF THE DRAWINGS

Embodiments of the invention are represented schematically with the aid of the drawing and shall be described schematically and at length with reference to the drawing.

FIG. 1 shows in schematic representation a cutout view of one embodiment of a system to carry out one embodiment of a method.

DETAILED DESCRIPTION

FIG. 1 shows schematically a cutout view of one embodiment of the energy system 100 described herein. Not shown are the connection of the HV battery 10 to the HV onboard network, the HV onboard network, or the LV onboard network of the vehicle.

The HV battery 10 comprises a first sub-branch 11 and a second sub-branch 12. To the first sub-branch 11 is connected a first DC/DC converter 21, having a transformer 31 with central tap. To the second sub-branch 12 is connected a second DC/DC converter 22 having a central tap. The HV bridges on the primary side of the transformers 31, 32 are designed as full bridges. On the secondary side of the transformers 31, 32, the central tap is utilized (center tap technology). Thanks to the redundant design of the DC/DC converters 21, 22, the availability of the LV onboard network connected to the outputs of the DC/DC converters 21, 22 is enhanced, so that in event of a fault in one sub-branch 11,12 of the HV battery 10 a disconnecting of the highly-available LV onboard network is avoided. The DC/DC converters 21, 22 for the powering of the LV onboard network are connected in front of the main contactors of the HV battery 10.

German patent application no. 10 2021 128139.3, filed Oct. 28, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for electrical power supply of an electric vehicle that includes at least one first onboard network and at least one second onboard network, wherein a voltage of the at least one first onboard network is greater than a voltage of the at least one second onboard network, and a battery connected to the at least one first onboard network, wherein the battery includes a first sub-branch and a second sub-branch that are switched in series, the system comprising:
a first direct current/direct current (DC/DC) converter that includes a first transformer,
wherein an input of the first DC/DC converter is connected to the first sub-branch, and
wherein an output of the first DC/DC converter is connected to the at least one second onboard network; and
a second DC/DC converter that includes a second transformer,
wherein an input of the second DC/DC converter is connected to the second sub-branch,
wherein the output of the second DC/DC converter is connected to the at least one second onboard network,
wherein the first DC/DC converter and the second DC/DC converter have a redundant design,
wherein a first power pathway between the first sub-branch and the at least one second onboard network is independent of a second power pathway between the second sub-branch and the at least one second onboard network,
wherein the first power pathway and the second power pathway are electrically in parallel such that a fault in one of the first sub-branch or the second sub-branch does not result in a fault in electrical power supply to the at least one second onboard network,
wherein the first DC/DC converter includes a first active full bridge on a secondary side of the first transformer,
wherein a center tap of the secondary side of the first transformer is used on the secondary side of the first transformer,
wherein the second DC/DC converter includes a second active full bridge on a secondary side of the second transformer, and
wherein a center tap of the secondary side of the second transformer is used on the secondary side of the second transformer.

2. The system according to claim 1, wherein the first DC/DC converter includes a first full bridge on a primary side of the first transformer, and wherein the second DC/DC converter includes a second full bridge on a primary side of the second transformer.

3. The system according to claim 1, wherein the first DC/DC converter uses a first central tap of the first transformer on a secondary side of the first transformer, and wherein the second DC/DC converter uses a second central tap of the second transformer on a secondary side of the second transformer.

4. The system according to claim 1, wherein the first DC/DC converter, in operation, provides a first voltage level at an output of the first DC/DC converter, and wherein the second DC/DC converter, in operation, provides a second voltage level at an output of the second DC/DC converter.

5. A method for electrical power supply of an electric vehicle that includes at least one first onboard network and at least one second onboard network, and a battery that includes a first sub-branch and a second sub-branch that are switched in series, a first power pathway between the first sub-branch and the at least one second onboard network being independent of a second power pathway between the second sub-branch and the at least one second onboard network, and the first power pathway and the second power pathway being electrically in parallel such that a fault in one of the first sub-branch or the second sub-branch does not result in a fault in electrical power supply to the at least one second onboard network, the method comprising:
connecting the at least one first onboard network to the battery;
connecting the at least one second onboard network to an output of a first direct current/direct current (DC/DC) converter;
connecting an input of the first DC/DC converter to the first sub-branch;
connecting the at least one second onboard network to an input of a second DC/DC converter; and connecting an input of the second DC/DC converter to the second sub-branch, wherein the first DC/DC converter and the second DC/DC converter have a redundant design, wherein the first DC/DC converter includes a first active full bridge on a secondary side of a first transformer, wherein a center tap of the secondary side of the first transformer is used on the secondary side of the first transformer, wherein the second DC/DC converter includes a second active full bridge on a secondary side of a second transformer, and wherein a center tap of the secondary side of the second transformer is used on the secondary side of the second transformer.

* * * * *